United States Patent [19]
Tsang et al.

[11] Patent Number: 4,559,818
[45] Date of Patent: Dec. 24, 1985

[54] THERMAL WELL-TEST METHOD

[75] Inventors: Chin-Fu Tsang, Albany; Christine A. Doughty, Berkeley, both of Calif.

[73] Assignee: The United States of America as represented by the United States Department of Energy, Washington, D.C.

[21] Appl. No.: 583,451

[22] Filed: Feb. 24, 1984

[51] Int. Cl.$^4$ .............................................. E21B 47/06
[52] U.S. Cl. ..................................................... 73/154
[58] Field of Search .................... 73/154, 155; 166/64, 166/250

[56] References Cited

U.S. PATENT DOCUMENTS

| | | |
|---|---|---|
| 2,242,612 | 5/1941 | Leonardon . |
| 2,403,704 | 7/1946 | Blau . |
| 3,122,016 | 2/1964 | Fordham ............................. 73/154 |
| 3,180,148 | 4/1965 | Huckabay et al. . |
| 3,410,136 | 11/1968 | Johns et al. ............................. 73/154 |
| 3,709,032 | 1/1973 | Coles, Jr. et al. ....................... 73/154 |
| 3,745,822 | 7/1973 | Pierce et al. ............................ 73/154 |
| 3,795,142 | 3/1974 | Smith et al. ............................. 73/154 |
| 3,805,587 | 4/1974 | Sayer . |
| 3,808,889 | 5/1974 | Rawson et al. ......................... 73/154 |
| 4,143,549 | 3/1979 | Koehler . |
| 4,313,342 | 2/1982 | Poppendick .......................... 73/154 |

FOREIGN PATENT DOCUMENTS 306255 7/1971 U.S.S.R. ................. 73/154

OTHER PUBLICATIONS

Bodrarsson, G. S., Mathematical Modeling . . . Systems Under Exploration, Ph.D. Thesis, Univ. of Calif. LBL-13937, Jan. 1982.
Theis, C. V., The Relation Between . . . Ground-Water Storage, Transactions, American Geophysical Union, 1935, pp. 519-524.
Hellstrom, G. et al., Heat Storage . . . Stratification Problems, Univ. of Calif. LBL-14246, Oct. 1979.
Doughty, C. et al., A Dimensionless Parameter . . . Storage System, Water Resources Research, vol. 18, No. 3, Jun. 1982, pp. 571-587.
Tsang, C. F. et al., A Nonisothermal Well Test Analysis Method, Univ. of Calif. LBL-14968, Nov. 1982.

Primary Examiner—Jerry W. Myracle
Attorney, Agent, or Firm—L. E. Carnahan; Roger S. Gaither; Judson R. Hightower

[57] ABSTRACT

A well-test method involving injection of hot (or cold) water into a groundwater aquifer, or injecting cold water into a geothermal reservoir. By making temperature measurements at various depths in one or more observation wells, certain properties of the aquifer are determined. These properties, not obtainable from conventional well test procedures, include the permeability anisotropy, and layering in the aquifer, and in-situ thermal properties. The temperature measurements at various depths are obtained from thermistors mounted in the observation wells.

10 Claims, 3 Drawing Figures

THERMAL WELL-TEST METHOD

BACKGROUND OF THE INVENTION

The invention described herein arose at the Lawrence Berkeley Laboratory in the course of, or under, Contract No. DE-AC03-76S00098 between the United States Department of Energy and the University of California.

The invention is directed to well-test methods, particularly to an improved well-test method utilizing one or more observation wells, and more particularly to a thermal well-test method.

Conventional well-test analysis methods involve the flowing of one well and the measurement of transient pressure behavior in that well or in one or more observation wells. These isothermal methods normally provide information only on the permeability, storativity, and lateral boundaries of an aquifer. Several thermally related methods have also been proposed; these prior well testing methods being exemplified by U.S. Pat. Nos. 3,795,142 issued Mar. 5, 1974 to R. C. Smith et al; 3,709,032 issued Jan. 9, 1973 to R. D. Coles, Jr. et al; 3,745,822 issued July 17, 1973 to A. E. Pierce et al; 3,410,136 issued Nov. 12, 1968 to E. Johns et al; 2,242,612 issued May 20, 1941 to E. G. Leonardon; and 4,313,342 issued Feb. 2, 1982 to H. F. Poppendick.

While these prior known testing methods have been effective for providing information relative to the permeability, storativity, etc., discussed above, there are a number of other types of information needed which cannot be obtained by these prior methods. Additional information is desirable for applications such as aquifer thermal energy storage, assessment of contaminant transport in an aquifer, and injection into a geothermal reservoir. For these applications, information about the aquifer such as the permeability anisotropy and layering characteristics are of great importance. In the case of aquifer thermal energy storage and injection into geothermal reservoirs, knowledge of the in-situ thermal properties also is useful.

It is thus seen that the conventional well-test methods are not adequate to provide information needed for various types of applications, and a need has existed for a well-test method which provides this information.

Therefore, it is an object of the present invention to provide a well-test method which provides information not previously available through use of conventional testing methods.

A further object of the invention is to provide a well-test method by which information about an aquifer such as the permeability anisotropy and layering characteristics can be obtained.

A still further object of the invention is to provide a well-test method by which in-situ thermal properties can be obtained for applications such as aquifer thermal energy storage and geothermal reservoir injections.

Another object of the invention is to provide a thermal well-test method.

Another object of the invention is to provide a new well-test method involving injection of hot (or cold) water into a groundwater aquifer, or injecting cold water into a geothermal reservoir, wherein temperature measurements at various depths are obtained in one or more observation wells.

Other objects and advantages provided by this invention will become readily apparent to those skilled in the art from the following description and accompanying drawings.

SUMMARY OF THE INVENTION

The above objects and advantages of the present invention are carried out by a thermal well-test method. The thermal well-test method is basically as follows:
1. a conventional well-test is carried out that will yield the values of horizontal permeability and storativity;
2. a measured volume of water at a known temperature (higher or lower than the aquifer temperature) is injected into the well at a specified rate;
3. during injection, temperature readings at several depths in one or more observation wells are recorded;
4. based on the temperature readings in the observation wells, the temperature distributions in the aquifer at various times are plotted,
5. optionally, at the end of the injection period, an equal volume of water is recovered from the same well, using a recovery rate equal to the original injection rate; and
6. if step 5 is carried out, the temperature of the recovered water is recorded as a function of time, and the recovery factor is calculated;

More specifically the procedure for carrying out the well-test method of this invention consists of:

A.
1. Install (drill if not available) one injection/production well (I/P) fully penetrating the aquifer.
2. Install (drill if not available) one or more observation wells with thermistors mounted at several depths, and backfill.

B. Pump from I/P, measure drawdown and use standard technique to determine transmissivity, storativity, and location of lateral boundaries. With transmissivity and estimation of aquifer thickness from drilling information determine horizontal permeability ($k_h$).

C.
1. Inject a volume $V_w$ of hot or chilled water at constant temperature $T_w$ and flow rate Q through I/P for a period of time $t_i$ ($V_w = Qt_i$).
2. During injection, record the temperatures in the observation well(s).
3. Optionally, reverse the pump and produce the water at the same flow rate for the same period of time.
4. If step 3 is carried out, during production record the temperatures in the observation well(s) and the temperature of the produced water, $T_p$.

By the above-outlined procedure, information such as the permeability anisotropy and layering characteristics, and the in-situ thermal properties of an aquifer can be obtained using techniques described hereinafter in the data-analysis section of the detailed description of the invention.

The temperature measurements are made at different depths in the one or more observation wells, using several thermistors at appropriate locations in the well(s). The observation well(s) are backfilled with sand, for example, to minimize vertical thermal convection within the observation well bore.

DETAILED DESCRIPTION OF THE INVENTION

Figure 1C:
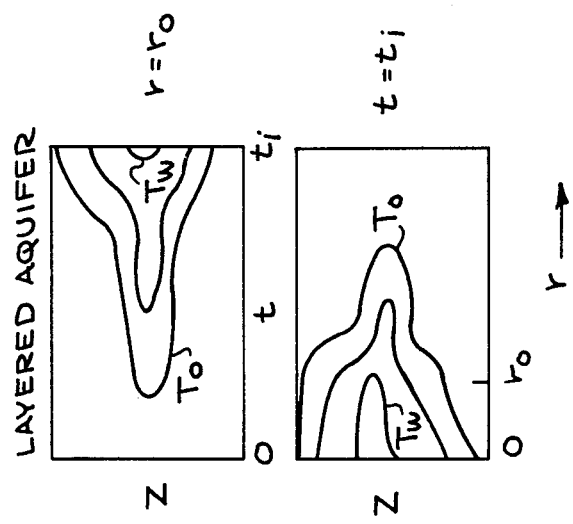
FIGS. 1a–1c are schematic contour plot diagrams of the temperature distributions used in carrying out the invention, wherein the upper row of plots, T(t,z), shows a time-sequence of temperature data from a single well located at a distance of $r_o$ from the test well (I/P); and the lower row, T(r,z), shows the spatial temperature distribution at a given time, $t_i$, drawn using data from multiple observation wells.

The present invention involves a new well-test analysis method which broadly involves the injection and optional removal of water at a temperature different from that of the aquifer being tested, with temperature measurements being made at different depths in one or more observation wells and temperature measurement of the recovered water. By the study and analysis of these temperature data the permeability anisotropy, layering characteristics, and in-situ thermal properties of the aquifer can be determined.

Theory

Prior to setting forth a detailed description of, or procedure for carrying out, the thermal well-test method of this invention, the theory underlining such a method is set forth. Considerable work has been done in recent years on the thermohydrologic behavior of an aquifer upon injection of water of a different temperature. Three major studies recently completed will be briefly discussed below, the results of which form the basis for the well-test analysis method of this invention. These three studies involve: (1) thermal front tilting, (2) low-buoyancy thermohydrological flow, and (3) simulation of thermohydrological flow using detailed numerical models.

Thermal Front Tilting Formula

When water of one temperature is injected through a vertical well into an aquifer of another temperature a vertical thermal front forms within the aquifer. Such a front is unstable because of buoyancy effects. Hot water tends to flow towards the top of the aquifer and cold water tends to flow towards the bottom causing the front to tilt. The tilting depends on the temperatures of the waters as well as the aquifer properties. The following formula has been derived which gives the time rate of tilting, $\omega_o$, of a vertical thermal front as:

$$\omega_o = 14.5 \frac{\sqrt{k_v k_h}}{H} \frac{C_w}{C} \frac{(\rho_o - \rho_1)}{\left(\frac{\mu_o + \mu_1}{2}\right)} \text{ (radians/sec)}. \tag{1}$$

The formula (1) shows how $\omega_o$ is directly proportional to the density difference of the two waters $(\rho_o - \rho_1)$; inversely proportional to the average of their viscosities $((\mu_o + \mu_1)/2)$; inversely proportional to the thickness of the aquifer (H); and directly proportional to the square root of the product of vertical and horizontal permeabilities ($\sqrt{k_v k_h}$). $C_w$ and C are the volumetric heat capacities of the injected water and the aquifer (water+rock), respectively. Thus, if the fluid properties, thickness, and heat capacity of the aquifer are known, by measuring the tilting angle of the thermal front ($\alpha = -\omega_o t_i$) after a period of injection, $t_i$, an estimate of the quantity $\sqrt{k_v k_h}$ can be obtained. This determines the aquifer permeability anisotropy, $k_v/k_h$, if $k_h$ is known from a conventional well-test. Formula (1) involves a number of simplifying assumptions, hence this approach can only yield a rough estimate of the value of the permeability anisotropy.

If only one observation well is used an alternative analysis may be done which does not require a measure of $\alpha$, but uses the different horizontal flow rates, $Q_i$, of various layers in the aquifer (see data analysis section, item 3b). The difference between the layer flow rates and the injection rate yields the pure buoyancy flow rate, $Q_{fi} = Q_i - Q$. These values of $Q_{fi}$ can be matched against published curves plotting $Q_f$ as a function of depth for various values of $\sqrt{k_v k_h}$ in order to determine $\sqrt{k_v k_h}$.

For further information relative to the derivation of formula (1) and presentation of the $Q_f$ curves, see report LBL-14246, "Heat Storage In Aquifers: Buoyancy Flow and Thermal Stratification Problems", G. Hellstrom et al, October 1979.

Low-Buoyancy Thermohydrological Flow

In the case where the temperature difference between injected water and native water is small, or in the case of a low-permeability aquifer where the flow is dominated by the horizontal forced convection from the injection well, buoyancy flow may be neglected. In this special case a dimensionless approach has been developed by C. Doughty et al, "A Dimensionless Parameter Approach To The Thermal Behavior Of An Aquifer Thermal Energy Storage System", Water Resources Research, Vol. 18, No. 3, Pages 571–587, June 1982, which considers the injection and subsequent production of hot or chilled water into a confined aquifer through a single fully-penetrating injection-production well. The recovery factor is defined as the energy produced divided by the energy injected, for equal volumes produced and injected, using the original aquifer temperature, $T_o$, as a reference point. The recovery factor as a function of three dimensionless parameter groups, Pe, $\Lambda$, $\lambda/\lambda_c$ is tabulated from a series of numerical simulations. Pe and $\Lambda$ are given by the following formulas:

$$Pe = (QC_w)/(2\pi\lambda H) \tag{2}$$

$$\Lambda = (C^2 H^2)/(C_c \lambda_c t_i) \tag{3}$$

Figure 1B:
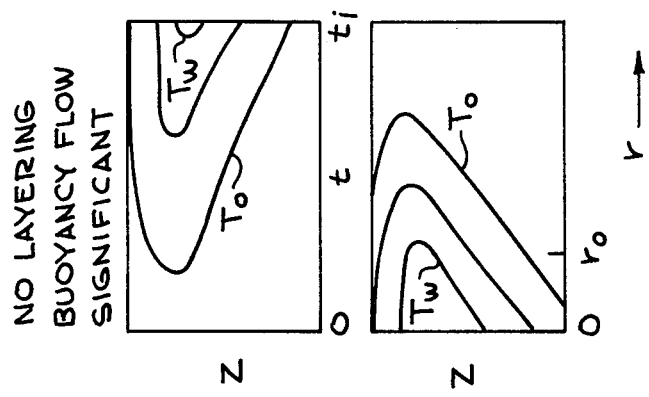
Figure 1A:
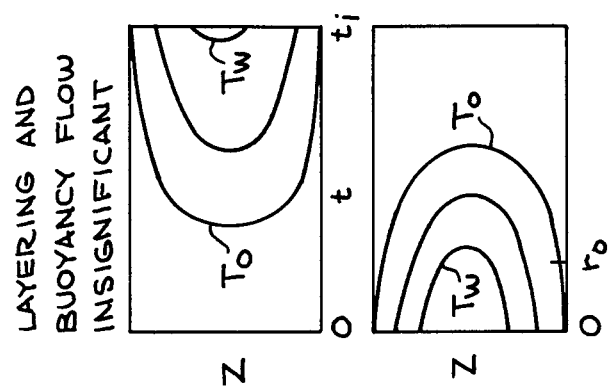

Q is the volumetric injection/production flowrate; $\lambda$ and $\lambda_c$ are the thermal conductivities in the aquifer and the confining layers, respectively; $C_c$ is the volumetric heat capacity in the confining layers; $t_i$ is the injection time. Recovery factor contours can be plotted in the Pe-$\Lambda$ plane for several values of $\lambda/\lambda_c$, as illustrated in FIG. 1 of report LBL-14968, "A Nonisothermal Well Test Analysis Method", C. F. Tsang et al, bearing a date of November 1982, and may be used to predict the recovery factor for a proposed energy storage experiment when the properties of the system are known. Conversely, if some of the properties of the system and the experimental recovery factor from a test in which a volume of hot water is injected and then subsequently produced (recovered) are known, the remaining properties can be derived. For instance, if the thermal properties of the confining layers and the heat capacity in the aquifer are known, $\Lambda$ is defined. Together the experimental recovery factor and $\Lambda$ give a value for Pe for each $\lambda/\lambda_c$. Since Pe also depends on $\lambda$, the correct Pe is that which yields $\lambda$ consistent with the $\lambda/\lambda_c$ value. As discussed in Doughty et al, referenced above, the effective thermal conductivity $\lambda$ involves not only the ordinary thermal conductivity of the aquifer material but also depends on the dispersivity of the medium. Thus, this test provides a direct estimate of $\lambda$, which cannot be confidently deduced from laboratory experiments.

Simulation of Thermohydrological Flow Using Detailed Numerical Models

In the case where buoyancy effects as well as conduction and forced convection are important in an aquifer system, numerical models may be used to calculate the coupled heat and fluid flows. Much progress has been made in recent years in developing numerical codes that can adequately simulate these flows. One such computer program which has been developed is numerical code "PT" described in report LBL-13937, "Mathematical Modeling Of The Behavior Of Geothermal Systems Under Exploitation", G. S. Bodvarsson, Ph.D. Thesis, University of California, Berkeley, 1982. The numerical code "PT" employs the integrated-finite-difference method to calculate the fluid and heat flow in a three-dimensional heterogeneous complex-geometry porous or fractured medium. Temperature-dependent fluid and rock properties are input to the code by means of equations or tables. Gravity effects are included in the calculations so that buoyancy flow in the porous medium may be simulated. Complex boundary conditions as well as sources and sinks can be modeled by the code. The program "PT" has been validated against many analytic or semianalytic solutions and has also been verified against a series of field experiments. For application to the analysis of thermal well testing, the numerical model "PT" is applied to reproduce the temperature distribution measured within the aquifer upon injection of water at a different temperature from the native groundwater. By varying model parameters such as permeability anisotropy and layering or thermal properties, a match may be obtained between the calculated and observed temperature values, thus determining the values of these aquifer properties.

Procedure

Based on the theoretical work briefly described above, the procedure described hereinafter for carrying out the well-test method of this invention will give not only the conventional well-test analysis results but also additional information that is useful for certain projects. The operational procedure for this inventive thermal well-test is as follows:

1. A conventional well-test is carried out that will yield the values of horizontal permeability, $k_h$, and storativity, S. For example, such a conventional well test consists of the following operational steps: Install (drill if not available) one injection/production well (I/P) fully penetrating an aquifer. Pump from I/P at a constant rate for a period of time while measuring drawdown. Match drawdown versus time curve to published type-curve (see for example Theis, C. V., "The relationship between the lowering of piezometric surface and the rate and duration of discharge using groundwater storage", *Transactions, American Geophysical Union*, 2, pages 519–524, 1935) thus determining transmissivity T, and storativity. Using aquifer thickness H, determined from drilling information, determine horizontal permeability $k_h = T/H$.

2. A volume of water, $V_w$, at a temperature, $T_w$, higher (or lower) than the aquifer temperature, $T_o$, is injected into I/P by a pump system at a specified rate, Q, for a period of time, $t_i$, while temperature readings at several depths in one or more observation wells are recorded. The temperature readings, for example, may be taken at depths of 2, 5 and 8 m from the top of a 10 m thick aquifer. For example, the $V_w$ may be 50,000 to over 1 million gallons. $T_w$ may be 15° to 90° C. for hot-water injection or 3° to 15° C. for cold-water injection, into a groundwater aquifer with $T_o$ in the range from 5° to 20° C.; $T_w$ may be up to 100° C. for cold-water injection into a geothermal reservoir with $T_o$ in the range of 150° to 300° C. The value of $t_i$ may range from 1 to 30 days. The observation wells should be distributed over a distance R from the test well I/P, where $R = \sqrt{V_w/H} = \sqrt{Qt_i/H}$. If there is only one observation well, it should be located at a distance of approximately $\frac{1}{2}$ R from I/P. For example, if Q=50 gpm and $t_i$=5 days (=7200 min), then $V_w = Qt_i = 50.7200 = 360{,}000$ gal (=1360 m$^3$). If H=10 m, then $R = \sqrt{V_w/H} = \sqrt{1360/10} = 12$ m. The temperature readings are taken, for example at depths of 2, 5 and 8 m from the top of a 10 m thick aquifer. The temperature readings in the observation wells may be obtained via thermistors located at the desired depth, whereafter the observation wells are backfilled with sand or other suitable material to prevent or minimize vertical thermal convection within these wellbores.

3. Optionally, at the end of the injection period, the injection pump system is reversed and a volume $V_w$ is produced or pumped from the same well, with the production or pumping rate, Q, being the same as the injection rate.

4. If step 3 is carried out, the temperature of the produced water, $T_p$, and the temperature in the observation well(s) are recorded as a function of time during production, which lasts for a period of time equal to $t_i$.

Data Reduction

The data reduction is carried out as follows:

1. Make a contour plot of temperature distribution at the end of the injection period, T(r,z), if there are enough observation wells.

2. Make a contour plot of temperature versus time for each well T(t,z).

If the injected water was subsequently recovered:

3. plot $T_p$ versus time.

4. Calculate recovery factor, $\epsilon$, from $$\epsilon = (\overline{T}_p - T_o)/(T_w - T_o),$$

where $\overline{T}_p$ is the average temperature of the produced water.

Data Analysis

With the above data, the analysis is accomplished as follows:

1. To determine general character of aquifer.

Examine the temperature distribution at the end of injection T(r,z) and the T(t,z) contours for each well. Match them to one of the three schematic diagrams of FIGS. 1a, 1b and 1c to determine the general character of the aquifer. If there are enough observation wells to draw accurate T(r,z) plots, use the T(r,z) plot at the end of injection to determine heat capacity, C, and porosity, $\phi$, (see item 2 below). Then proceed to 1a, 1b, or 1c below. If there are too few observation wells to draw T(r, z) plots, use the appropriate T(t,z) method to determine C and $\phi$. (see item 3a, 3b, or 3c below). Next use the appropriate T(t,z) to T(r,z) transformation (see item 4a, 4b, or 4c below). Then proceed to 1a, 1b, or 1c.

a. Layering and buoyancy flow insignificant. Use dimensionless approach (see item 5 below) to determine effective thermal conductivity, $\lambda$. Use tilting angle formula (see item 6 below) to get an upper limit for permeability anisotropy, $k_v/k_h$. If desired, use numerical model sensitivity study (see item 8 below) to check properties determined.

b. No layering, buoyancy flow significant. Use, tilting angle formula (see item 4 below) to determine $k_v/k_h$. Use numerical model sensitivity study (see item 8 below) to determine $\lambda$ and if desired, check other properties.

c. Layered aquifer. Use relative flow-rate method (see item 7 below) to estimate relative permeabilities of layers. Use numerical model sensitivity study (see item 8 below) to determine $\lambda$ and, if desired, check other properties.

2. To Determine Heat Capacity, C, and Porosity, $\phi$, with Multiple Observation Wells—T (r,z) method.

Use the temperature distribution at the end of injection, T(r,z) and the formula:

$$C = C_w(T_w - T_o)V_w / \int v(T - T_o)dV,$$

which is based on energy conservation. $C_w$ is the heat capacity of water, and V is the volume of the aquifer. The integral is evaluated from a contour plot of T(r,z); the integral may be approximated as a sum:

$$S = \sum_n (\overline{T}_n - T_o) V_n$$

where the $V_n$ are the volumes bounded by two adjacent contours, and $\overline{T}_n$ the average of the two contour levels. The $V_n$ may be approximated as cylinders or annuli.

Porosity may be determined from $$\phi = (C - C_r)/(C_w - C_r)$$

if the value of $C_r$, rock heat capacity, is known.

3. To determine heat capacity, C, and porosity, $\phi$, with one observation well—T(t,z) method.

a. Layering and buoyancy flow insignificant.

Simple method—The time t' (measured from the beginning of injection) that the temperature $T = (T_w + T_o)/2$ arrives at an observation well located at a distance of $r_o$ from I/P is used to determine C:

$$C = \frac{C_w Q t'}{\pi r_o^2 H}$$

More accurate method—The time t" (measured from the beginning of injection) that the temperature $T_w$ reaches an observation well located at a distance of $r_o$ from I/P is used to determine C:

$$C = \frac{C_w Q \left\{ (T_w - T_o)t'' - \sum_{j=1}^{J} \left[ \left( \frac{T_j + T_{j-1}}{2} \right) - T_o \right] (t_j - t_{j-1}) \right\}}{\pi r_o^2 H (T_w - T_o)}$$

where the times $t_j$ correspond to the times the temperatures $T_j$ are measured at the observation well, and $t_o = 0$ and $t_J = t''$. This equation is based on conservation of energy.

b. No layering, buoyancy flow significant; and c. Layered Aquifer.

The combined vertical and horizontal flows due to natural and forced convection that result in a tilted front (FIG. 1b) and the differential flow into variable permeability layers (FIG. 1c) are approximated by layers of horizontal (radial) flow, with higher flow rate in layers showing greater radial extent of the thermal region. The flow rate in each layer, $Q_i$, is inversely proportional to the time $t_i'$ at which the temperature $T = (T_w + T_o)/2$ arrives at $r_o$ in that layer. The actual flow rates for each layer are found by requiring the sum of the flow-rate-thickness products of all the layers be equal to the total flow rate times aquifer thickness:

$$\sum_i Q_i H_i = QH$$

Then each layer can be used to determine C as in part a above:

Simple method -

$$C = \frac{C_w Q_i t_i'}{\pi r_o^2 H_i}$$

More accurate method -

$$C = \frac{C_w Q_i \left\{ (T_w - T_o)t_i'' - \sum_{j=1}^{J} \left[ \left( \frac{T_{i,j} + T_{i,j-1}}{2} \right) - T_o \right] (t_j - t_{j-1}) \right\}}{\pi r_o^2 H (T_w - T_o)}$$

where $T_{i,j}$ is the temperature measured in layer i at time $t_j$ and $t_i''$ is the time at which temperature $T_w$ arrives at $r_o$ in layer i. The values obtained for C for each layer should agree. The approximation of layers of horizontal flow is quite good for a layered aquifer, and less accurate for the non-layered, strong buoyancy flow case. Porosity, $\phi$, is determined from C as in item 2 above.

4. T(t,z) to T(r,z) transformation.

a. Layering and buoyancy flow insignificant. To transform a time-sequence of data, T(t,z), taken from an observation well located a distance $r_o$ from I/P, to a "snap-shot" of the aquifer for a given time $t_r$, T(r,z), the equation $$r = \left[ r_o^2 + \frac{C_w Q(t_r - t)}{\pi C H} \right]^{\frac{1}{2}}$$

is used to find the value of r for each value of t.

b. No layering, buoyancy flow significant; and
c. layered aquifer.

As in item 3 above the flow field is approximated by layers of horizontal flow with flow rate $Q_i$ and thickness $H_i$. The transformation equation for the ith layer is $$r = \left[ r_o^2 + \frac{C_w Q_i(t_r - t)}{C \pi H_i} \right]^{\frac{1}{2}}$$

5. Dimensionless approach to determine effective thermal conductivity, $\lambda$.

For this technique the injected water must be subsequently recovered. The experimental recovery factor, $\epsilon$, is compared to plots of recovery factor as a function of the dimensionless groups $\Lambda$, Pe, and $\lambda/\lambda_c$. The definitions of Pe, and $\Lambda$ are:

$$Pe = \frac{QC_w}{2\lambda H}$$

$$\Lambda = \frac{C^2 H^2}{C_c \lambda_c t_i}$$

Where $C_c$ and $\lambda_c$ are the heat capacity and conductivity of the confining layers surrounding the aquifer, and may be determined from core samples, or estimates of values for typical materials. Given $\Lambda$, and $\epsilon$, the plots of recovery factor versus Pe, $\Lambda$, and $\lambda/\lambda_c$ may be used to determine a value of Pe for each $\lambda/\lambda_c$ value. Each Pe can be solved for $\lambda$, the correct value of $\lambda$ is that which is consistent with the corresponding value of $\lambda/\lambda_c$.

6. Tilting angle formula to determine permeability anisotropy, $k_v/k_h$.

The tilting angle of the thermal front at the end of injection can be measured from the temperature distribution T(r,z). The angle, $\alpha$, is measured relative to the vertical. The tilting rate is given by $\omega_o = \alpha/t_i$, where $\omega_o$ is given by:

$$\omega_o = 833 \cdot \frac{\sqrt{k_v k_h}}{H} \cdot \frac{C_w}{C} \cdot \frac{(\rho_o - \rho_1)}{\left( \frac{\mu_o + \mu_1}{2} \right)} \text{ (degrees/sec)}$$

The parameters $\rho$ and $\mu$ are density and viscosity of water, and $k_v$ is vertical permeability. The subscripts o and 1 refer to the temperatures of the native and injected waters. By substituting $\alpha/t_i$ for $\omega_o$ the value of $k_v$ may be determined. The tilting rate formula is approximate, and is most accurate for small tilt angles, so if tilting is large at the end of injection, a better result will be obtained by measuring the tilting angle for a shorter period of time than $t_i$. When only one observation well is used; the layer flow rates $Q_i$ (see item 3b above) can be used in conjunction with published curves of buoyancy flow to determine $\sqrt{k_v k_h}$. When no tilting is apparent, an upper bound for $k_v$ can be determined by using the formula with $\alpha \approx 1$ degree.

7. Relative flow-rate method to estimate relative permeabilities of layers.

If the T(r,z) method (see item 3 above) was used to determine C, then the flow rates into the different layers, $Q_i$, are known. If the T(r,z) method was used to determine C, then the T(r,z) plot is examined to determined relative flow rates as follows: The radial extent of the fluid flow into each layer (measured as the distance to the temperature $T = (T_w + T_o)/2$) is proportional to the square root of the flow rate into that layer. Since the flow rate is proportional to permeability, the relative flow rates determine the relative permeabilities of the different layers. The actual permeabilities are found by requiring that the average permeability-thickness of all the layers be equal to the transmissivity determined from the conventional well-test.

8. Numerical model sensitivity studies.

The numerical code "PT" or a code with similar capabilities is used to simulate the thermal well test. Trial values for the model's aquifer properties are used for an initial run, then modified until the simulated and observed temperature distributions match. This technique may be used directly to determine any of the desired aquifer properties, but generally it is more cumbersome than analyses 1 through 7 above. It can be used more efficiently subsequent to other methods to check and fine-tune results.

Discussion Of Analysis

The novel T(t,z) plots can be drawn with good accuracy because it is simple and inexpensive to take many temperature measurements over time at a single well. In contrast, there is more uncertainty in drawing the traditional T(r,z) plots because the number of observation wells is strongly limited by cost and practicality.

For reasonable conditions, the T(t,z) plots can be transformed to T(r,z) plots allowing temperature data from a single observation well to provide information on the spatial temperature distribution in the aquifer. The transformation is most accurate when buoyancy flow and layering are insignificant and least accurate when buoyancy flow is strong. The transformation assumes radial symmetry around I/P. The T(t,z) plots can be used directly when comparing experimental and numerically-simulated results in sensitivity studies. This comparison is preferable to comparing experimental and calculated T(r,z) plots because of the greater accuracy of the T(t,z) plots.

The thermal energy, E, relative to $T_o$ in the aquifer is given by:

$$E = C \int_V (T - T_o) dV \quad (4)$$

where V is the aquifer volume. By conservation of energy, at the end of the injection period, E must be equal to the total amount of energy injected, $C_w(T_w - T_o)V_w$. Hence the aquifer heat capacity, C, is given by:

$$C = \frac{C_w(T_w - T_o)V_w}{\int_V (T - T_o) dV} \quad (5)$$

where the value of the integral is calculated from the temperature distribution T(r,z) at the end of the injection period.

If the T(t,z) method is used instead, the expression for E may be written as:

$$E = C\pi r_o^2 H (T_w - T_o) + \quad (6)$$

$$C_w Q \sum_{j=1}^{J} \left[ \left( \frac{T_j + T_{j-1}}{2} \right) - T_o \right] (t_j - t_{j-1})$$

for a case a, layering and buoyancy flow insignificant. The times $T_j$ correspond to the times the temperatures $T_j$ are measured at an observation well located a distance $r_o$ from I/P, $t_o=0$, $t_j=t''$ is the time that temperature $T_w$ reaches the observation well. The first term represents energy stored in the aquifer between $r=0$ and $r=r_o$, the second term accounts for energy that has flowed past $r_o$. Hence C is given by:

$$C = \frac{C_w Q \left\{ (T_w - T_o)t'' - \sum_{j=1}^{J} \left[ \left( \frac{T_j + T_{j-1}}{2} \right) - T_o \right] (t_j - t_{j-1}) \right\}}{\pi r_o^2 H (T_w - T_o)} \quad (7)$$

C is dependent on the porosity of the media, $\phi$, as well as the volumetric heat capacity of the rock matrix $C_r$:

$$C = \phi C_2 + (1-\phi) C_r \quad (8)$$

This gives an in-situ estimation of the porosity if the volumetric heat capacities of the rock and fluid are known.

$$\phi = (C - C_r)/(C_w - C_r) \quad (9)$$

If the temperature distribution shows that layering and buoyancy effects are negligible, the dimensionless approach may be applied. Based on the temperature of the produced water, the recovery factor can be calculated and the energy recovery factor contours used to get a relationship between Pe, $\Lambda$, and $\lambda/\lambda_c$. As explained above, this determines the in-situ effective thermal conductivity value. On the other hand, if a strong buoyancy effect is apparent the tilting angle of the thermal front would be measured. From there Equation 1 can be used to calculate the value of $\sqrt{k_v k_h}$. Comparing this with the estimated value of $k_h$, as determined by conventional well tests, a value for $\sqrt{k_v k_h}$, the permeability anisotropy, can be obtained. The difference between the layer flow rates $Q_l$ and the injection flow rate Q gives $Q_{fi}$, pure buoyancy flow rates for the various layers. These can be compared with plots of analytical solutions for pure buoyancy flow to determine $\sqrt{k_v k_h}$. This approach may be considered as an alternative to a conventional method which involves the analysis of pressure transient data measured in a partially penetrating observation well, such as described in an article by E. P. Weeks, "Determining the Ratio of Horizontal to Vertical Permeability by Aquifer-Test Analysis", Water Resources Research, Vol. 5, No. 1, Pages 196-214, 1969.

In the case where the aquifer is composed of layers of different permeabilities, fingering will occur and the temperature distribution in the aquifer at the end of the injection period will show a digitate pattern reflecting the various layers within the aquifer. To estimate the relative permeability of these layers, the relative flow rate method may be used. Because a variety of factors such as temperature-dependent fluid viscosity and thermal conduction between layers influence the extent of thermal flow into each layer, this method is quite approximate. However, it serves as an excellent starting point for numerical simulation sensitivity studies.

The use of a sophisticated numerical model such as the above-referenced "PT" code for sensitivity studies generally introduces fewer approximations than do the previously described methods, however, its use is far more complicated. An efficient approach is to use the simpler methods first, then fine-tune the results being numerical simulations. Complete injection/production cycles may be simulated, and calculated values of $T_p(t)$ and $\epsilon$ compared with observed values, as well as comparing temperature distributions. Additionally, numerical simulation studies allow greater flexibility for the experiment itself. If experimental conditions make requirements such as a fully-penetrating injection/production well, constant injection flow rate, or equal volumes injected and recovered impossible to meet, then whatever was done experimentally can be numerically modeled, with model parameters varied to match experimental temperature distributions.

The well-test procedure described above has been applied and validated against a series of field experiments carried out by Auburn University at Mobile, Ala., and such is described in detail in above-referenced report LBL-14968 by C. F. Tsang et al.

It has thus seen shown that this invention provides an improved well-test method that provides information not available from prior known test methods. By injecting water of a different temperature into a groundwater aquifer or geothermal reservoir and optionally withdrawing therefrom a similar quantity of water, and by making temperature measurements at various depths in one or more observation wells during injection and withdrawal of the water, properties of the aquifer not normally obtained from well test procedures can be determined. These properties include permeability anisotropy and layering and in-situ thermal properties. Further, this method has the advantage of yielding values for properties that are spatially averaged over the aquifer, thus including marco heterogeneities not measurable in laboratory samples.

The greater the distance between the test well I/P and the observation wells, the larger the region of the aquifer being studied is. The method is quite flexible in utilizing data from one or multiple observation wells. With fewer observation wells approximations must be made in certain aspects of data analyses. The most information on the aquifer can be obtained by using multiple observation wells together, T(r,z) plots, and complementing them with detailed data from each observation well, T(t,z) plots.

While specific examples, parameters, materials, etc. have been described, such are not intended to be limiting, and modifications will become apparent; and it is intended to cover in the appended claims all such modifications as come within the scope of the invention.

What is claimed is:

1. A well-test method for determining characteristics of a groundwater aquifer or geothermal reservoir, comprising the steps of:
    determining at least the horizontal permeability and storativity of an underground water containing area to be tested;
    installing temperature indicating means at different depths in at least one observation well located within the area to be tested;
    injecting into the water containing area a specified amount of water at a temperature different from the water in the area being tested;
    during injection of the water, obtaining temperature readings at different depths from the observation well; and
    plotting the temperature distributions for determining the general characteristics of the water containing area, heat capacity, porosity, effective thermal conductivity, permeability anisotropy and layering characteristics.

2. The method of claim 1 additionally including the steps of:
    withdrawing from the water containing area being tested a quantity of water equal to the amount of water injected;
    during withdrawal of the water, obtaining temperatures readings from the observation wells;
    obtaining the temperature of the water being withdrawn as a function of time; and
    processing the data to obtain the recovery factor.

3. The method of claim 2, wherein the water is withdrawn at the same rate at which water was injected into the water containing area.

4. The method of claim 2, additionally including the steps of:
    plotting a curve showing the temperature of the water withdrawn versus time; and
    calculating the recovery factor, by the formula $\epsilon = (\bar{T}_p - T_o)/(T_w - T_o)$, where $\bar{T}_p$ is the average withdrawal temperature, $T_o$ is the temperature of the water in the area to be tested prior to injection of different temperature water, and $T_w$ is the temperature of the water injected.

5. The method of claim 1, wherein the water is injected at a specified rate.

6. The method of claim 1, wherein the temperature readings from the observation wells are obtained by locating thermistors at various depths in the observation wells, and backfilling the observation wells to minimize vertical thermal convection within the wellbore.

7. The method of claim 1, additionally including the steps of:
    drilling an injection/production well in the area to be tested which penetrates the area to be tested,
    drilling at least one observation well adjacent to but at a distance from the injection/production well and in the underground aquifer or geothermal reservoir to be tested, and
    positioning temperature indicating devices at selected depths in each observation well.

8. The method of claim 1, wherein the step of processing the data includes:
    forming a contour plot of temperature distribution at the end of the injection period; and
    making a contour plot of temperature versus time for each observation well.

9. In a well-test method, the improvement comprising the steps of:
    locating a plurality of observation wells in the area of the well being tested;
    positioning temperature sensing devices at different depths in each of the observation wells;
    injecting water at a constant, but different, temperature at a specified rate into the well being tested;
    producing water from the well being tested at the same rate as the water was injected thereinto;
    during injection and production, record the temperatures in the observation wells;
    during production record the temperature of the produced water;
    using time-sequence temperature data from the observation wells along with spatial temperature distributions for selected times based on data from the observation wells, and
    utilizing the data thus obtained to determine various characteristics of the well being tested.

10. The method of claim 9, additionally including the step of backfilling the observation wells for minimizing vertical thermal convection within the wellbores.

* * * * *